United States Patent
Hinden et al.

[11] 3,762,541
[45] Oct. 2, 1973

[54] WELDING PIN DISPENSING MAGAZINE

[76] Inventors: Milton Hinden, 15 Bay Link, Massapequa, N.J. 11735; Charles Giannone, c/o Duro-Dyne Corp., Rt. 110, Farmingdale, N.Y. 11735

[22] Filed: Aug. 16, 1972

[21] Appl. No.: 281,205

Related U.S. Application Data

[63] Continuation-in-part of Ser. No. 138,901, April 30, 1971, Pat. No. 3,701,878.

[52] U.S. Cl............ 206/56 DF, 206/56 A, 206/65 K, 221/312 A
[51] Int. Cl............................................. B65d 83/00
[58] Field of Search ............ 206/56 R, 56 A, 56 AC, 206/56 DF, 65 K; 221/312 R, 312 A, 312 B, 312 C; 224/45 G; 227/120; 85/18

[56] References Cited
UNITED STATES PATENTS

| | | | |
|---|---|---|---|
| 3,180,489 | 4/1965 | McGinn | 206/65 K |
| 1,709,034 | 4/1929 | Nelson | 206/56 DF |
| 2,951,249 | 9/1960 | Saltz | 206/56 DF |
| 2,900,107 | 8/1959 | Erdmann | 221/312 A |
| 2,985,295 | 5/1961 | Erdmann | 221/312 A |
| 995,847 | 6/1911 | Drake | 221/312 B |

FOREIGN PATENTS OR APPLICATIONS

| | | | |
|---|---|---|---|
| 821,955 | 10/1959 | Great Britain | 221/312 A |
| 846,041 | 7/1970 | Canada | 221/312 R |

*Primary Examiner*—George E. Lowrance
*Assistant Examiner*—Steven E. Lipman
*Attorney*—Mark T. Basseches et al.

[57] ABSTRACT

The present invention relates to a welding pin dispensing magazine for holding and feeding a stack of sheet metal welding pins whereby the pins may be moved longitudinally relative to the carrier portion of the magazine, but are prevented from being shifted transversely relative thereto until the same reach a discharge station.

The pins are held in shingled fashion in such manner that the edge portions of the pins define a sawtooth arrangement which facilitates serial feeding and releasing of the pins.

10 Claims, 5 Drawing Figures

PATENTED OCT 2 1973 3,762,541

WELDING PIN DISPENSING MAGAZINE

This application is a continuation-in-part of copending application Ser. No. 138,901, filed Apr. 30, 1971, entitled SHEET METAL RESISTANCE WELDING PIN, and now U.S. Pat. No. 3,701,878.

BACKGROUND OF THE INVENTION

1. Field of the Invention

The present invention is in the field of a magazine or carrier member incorporating a multiplicity of stacked sheet metal welding pins, the carrier being particularly adapted to protect the sharpened points of the pins against damage during transit and to maintain the pins in the stacked arrangement to permit axial shifting movement of the pins relative to the carrier for facilitating serial feeding of the pins to a welding head or apparatus, the assembly being of simple and inexpensive construction which will permit the magazine member to be dis-carded after use.

2. The Prior Art

In the copending application above referred to there is disclosed a sheet metal welding pin adapted particularly to be used to secure insulation or the like to a surface portion of a duct, air conduit or the like.

SUMMARY OF THE INVENTION

The present invention may be summarized as relating to a stack of sheet metal welding pins having integral head portions and shank portions, the shank portions terminating in a sharpened tip. The pins are disposed within a carrier or magazine member which functions to protect the carefully formed sharpened tips against damage by assuring that the tips will not be blunted by contact with other pins or the carrier member, while at the same time holding the stacked pins in a manner permitting their being fed to a discharge station.

The stacked pins comprise head portions, with shank portions bent at right angles thereto, the shanks being formed of a portion of the heads, the deflected-out shank portions providing a channel in the heads. In the stack, the shank portions project through the channels of the adjacent pins.

The stack is disposed at an angle to the longitudinal axis of a carrier member or magazine whereby portions of the shanks and heads define a sawtooth configuration. The noted sawtooth configuration facilitates automatic feed of a single pin at a time by providing a space between adjacent pins for the introduction of a restraining element.

The carrier is preferably U-shaped in transverse section, the pins being mounted within the carrier with their shank portions disposed between the legs of the U.

The head portions of the pins are provided with apertures at least partially offset from the channels, the carrier including components offset from the flanges and lying within the apertures whereby transverse movement of pins relative to the carrier is prevented.

Preferably, the offset components which limit transverse movement terminate adjacent an end, typically the lower end, of the carrier, the terminal end of the offset portions defining a feed station whereat the pin adjacent the station may be shifted transversely to a welding head or to apparatus for conveying the pin to a welding head.

Accordingly, it is an object of the invention to provide a dispensing magazine which incorporates a stack of sheet metal welding pins disposed within a carrier, which carrier functions to protect and maintain the pins in compact order during shipment and storage and as a component of a guide and feeding system for the pins.

Still a further object of the invention is the provision of a magazine of the type described which may be readily incorporated into an automatic feeding magazine adapted serially to extract single pins from the magazine and shift the same to a welding head for application.

Still a further object of the invention is the provision of a dispensing magazine of the type described wherein the critically sharpened tips of the pins are maintained free of any possible contact with adjacent pins or with the magazine, whereby blunting of the tips is prevented.

It is a still further object of the invention to provide a magazine of the type described wherein pins are nested with the under surface of one pin disposed in engagement with the upper surface of the next adjacent pin, with the shanks in parallel overlapping arrangement and with the peripheral portions of the heads and tips of the shanks defining a sawtooth pattern, facilitating removal of the last pin by enabling ready restraint of the next to the last pin.

Still another object of the invention is the provision of a device of the class described wherein the carrier per se is simple, inexpensive and readily formed, and hence may be discarded after use when the pins carried thereby have been used up.

To attain these objects and such further objects as may appear herein or be hereinafter pointed out, reference is made to the accompanying drawings, forming a part hereof, in which:

FIG. 3 is a vertical sectional view of a dispenser mounted in operative position on an automatic feed device or the like;

Figure 1:
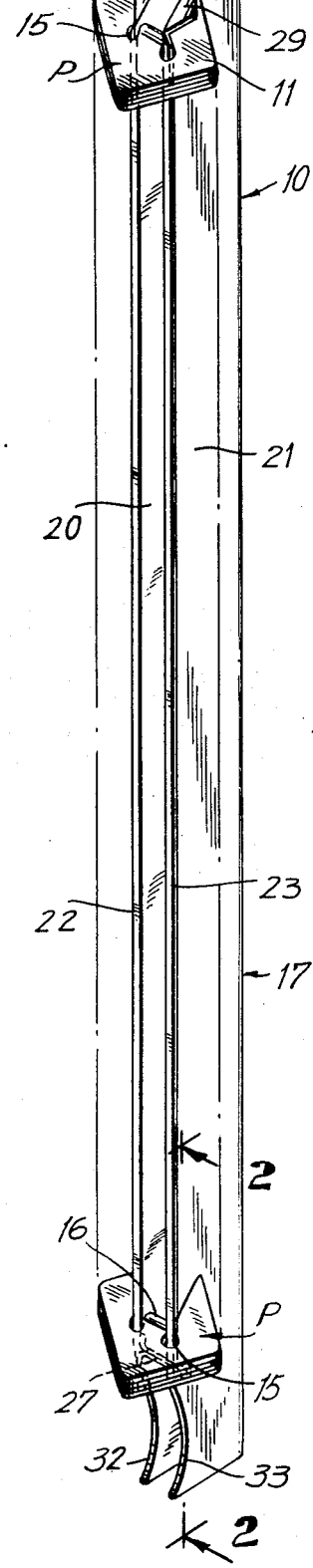
FIG. 1 is a perspective view of a filled dispenser in accordance with the invention.

Turning now to the drawings, there is shown in FIG. 1 a dispensing magazine 10 charged with welding pins in accordance with the invention. A substantial number of the pins normally disposed in the middle section of the magazine 10 have been omitted to enable details of the magazine to be seen with greater clarity.

The welding pins P, which are the subject matter of the above referred to copending application, comprise a head portion 11 and a shank portion 12 bent at right angles to the head portion. The shank portion is preferably formed by cutting the initially square sheet metal element along the slit lines 13, 14 to define the shank 12.

A pair of non-reentrant recesses 15 are formed surrounding the junction 16 of the shank 12 and head 11.

Since a detailed description of the welding pins per se is contained in the noted copending application, further elaboration thereof will not be made herein except to the extent necessary for an understanding of the interaction between the pins and the carrier component 17 of the magazine assembly 10.

As noted in the copending application, it is imperative that the tips 18 of the shanks 12 be extremely sharp in order to permit their penetration of the insulation without any possibility of gathering glass fibers at the tips, and also to assure that good electrical contact is made between the workpiece and the tips, to effect a satisfactory resistance weld.

A significant advantage of the instant device lies in the fact that the tip portions of the pins are disposed within the confines of the carrier 17 in a position in which they cannot touch each other or a wall of the carrier and thereby become blunted.

Figures 4, 5:
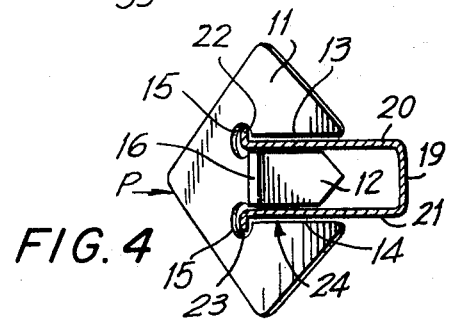
FIG. 4 is a horizontal section taken on the line 4—4 of FIG. 3.
FIG. 5 is a fragmentary vertical section of the lowermost end of an apparatus in accordance with a further embodiment of the invention.

As best seen in FIG. 4, the carrier per se is generally U-shaped in section, including a back portion or branch 19 and leg, flange or track portions 20, 21. The extremities of the flanges, legs or tracks 20, 21 are bent outwardly, as at 22, 23 to define retainer lips.

The welding clips or pins are nested with the under surface of the head portion 11 of any upper clip engaging against the upper surface of the head portion of the next lower clip, and with the shank 12 of each upper clip overlapping the upper surface of the shank of the next lower clip.

It will be appreciated that the shank portions 12 project downwardly through the space defined in the channel or opening 24 defined by the space between the slits 13, 14 after bending of the shank.

Figure 2:
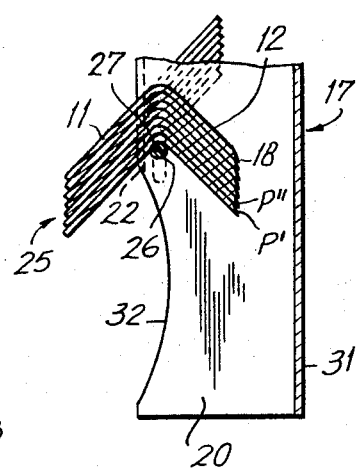
FIG. 2 is a vertical section taken on the lines 2—2 of FIG. 1.
Figure 3:
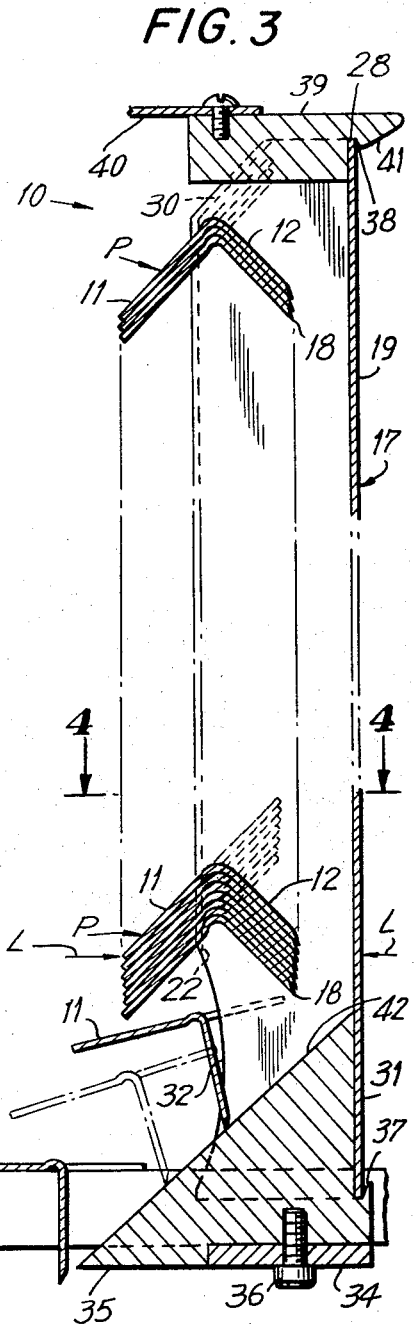

As best seen in FIGS. 2 and 3, the stack of clips or pins is arrayed with respect to the carrier in such manner that both the shanks and heads of the stacked pins are angularly oriented as respects the longitudinal axis of the carrier 17. It will be observed that in the stacked condition the recesses or apertures 15 formed in the heads of the pins are aligned. The stack of pins is disposed in the carrier 17 in such manner that the flanges or legs 20, 21 surround the shanks and extend adjacent the slits 13, 14, respectively, the outwardly turned lips 22, 23 being disposed within the recesses 15, 15.

As best appreciated from the horizontal sectional view of FIG. 4, with the parts arrayed in the manner shown, the welding pins cannot be shifted either outwardly or inwardly relative to the carrier by reason of the presence of the lips 22, 23 in the non-reentrant recesses 15, which are preferably in communication with channel 24.

It will be further appreciated that although it would be possible to rock a single clip about a horizontal axis while it is disposed in the noted position on the carrier 17, substantial rocking movement is impossible where a stack of such pins is simultaneously disposed on the carrier since the nesting of the heads and shanks of the pins requires that the entire stack act as a unit.

As best seen in FIGS. 2 and 3, the peripheral portions of the stacked pins at the outermost side 25 of the stack are arrayed to provide a sawtooth edge, hereinafter referred to as a shingled effect. This effect results from the fact that each identical pin is slightly offset from the central axis of the next pin by an amount equal to the thickness of the metal of the shank portion. The sawtooth or shingled edge thus defined is highly desirable when the magazine is used in connection with an automatic feed mechanism since it enables a blade spring, component of an escapement or like mechanical expedient, to be interposed between the lowest pin P' and the next lowest pin P" in a stack, thus forming a convenient restraining means to assure that the entire stack will not slip beyond a desired vertical position when the lowermost pin is removed.

In contrast, assuming the edge portions to be in registry, as would be the case, for instance, with a stack of cards, the restraining of the next lowest unit, on release of the lowest unit, would present substantial difficulties, requiring the use of complex spacers and like mechanisms to prevent the release of the second and subsequent units in the stack when the lowermost unit is removed.

The magazine is preferably provided with a pair of registering apertures 26, 26 in the flanges 20, 21, the apertures forming an anchor point for the transversely directed cotter pin 27 or like blocking mechanism which prevents shifting movement of the pins along the carrier 10 during shipment.

The flange portions 20, 21 at the upper edge 28 of the carrier are preferably bent outwardly or dogeared, as at 29 and 30, after the carrier has been charged with pins, to prevent removal of the pins in an upward direction.

The pins are removed from the carrier 17 in a transverse direction adjacent the lower end 31 of the carrier. To this end the lips 22, 23 are cut away and terminate at the level L (see FIG. 3), it being understood that it is the lips 22, 23 riding in the non-reentrant recesses 15, 15 above level L which prevent removal of the pins in an outward transverse direction at any point above such level.

Preferably the flanges 20, 21 in the area immediately below the level L are formed with arcuate recess surfaces 32, 33. The arcuate surfaces 32, 33 permit a turning movement of the pins below the level L while a measure of guidance is still provided the pins by the fact that the flanges 20, 21 enter into the channel 24.

In FIG. 3 a dispenser 10 is shown position in the receiver components of a form of feed apparatus. The feed apparatus may include a base portion 34, to which a guide block 35 is attached, as by machine screw 36. The block 35 may include a receiver notch 37, within which the lowermost extremity of the branch 19 of the carrier is seated.

The upper end of the carrier 17 may be engaged within a notch 38 formed within a locking finger 39 fixed to a blade spring 40 which yieldingly urges the finger 39 in a downward direction. The finger may include a depending cam face 41, permitting the dispenser 10 to be loaded by simply seating the lowermost edge of the dispenser in the notch 37 and pivoting the dispenser inwardly until its upper end engages the cam surface 41, forcing the finger 39 upwardly against the yielding force of the spring 40 until the retainer shoulder or notch 38 in the finger 39 snaps over the upper end of the dispenser.

Preferably the block 35 includes a downwardly inclined guide face 42 which engages the lowermost sharpened ends of the shanks to induce a turning or rotation of the shanks as they shift from the dispenser, thereby to cause the heads 11 to assume a horizontal position, with the shanks extending through a guideway 43 forming a part of the feed apparatus.

In FIG. 5 there is shown an alternative embodiment in which the turning and guide functions of the inclined surface 42 of the block 35 are performed by a tongue 44 formed at the lower end of the carrier 17, the tongue 44 being preferably struck from a portion of the branch 19 of the U-shaped carrier section.

From the foregoing it will be appreciated that there is provided in accordance with the present invention a dispenser apparatus including stacked welding pins and a carrier, whereby the pins are conveniently stored for shipping and use in such manner that the carefully formed points of the shanks 12 are protected within the U-shaped carrier 17 against blunting contact with the interior of the carrier or with adjacent pins.

The stacked pins are maintained during storage and shipment at a level about the level L, being released to proceed to the automatic feed apparatus, preferably after loading, by removal of the cotter pin 27 or like restrainer means.

As previously noted, by reason of the shingled configuration of the edges of the heads of the pins, automatic feed is greatly facilitated.

It will be observed that the carrier 17 may be conveniently made of inexpensive sheet metal stamped to the desired configuration and bent into the U shape shown, the cost of the carrier being so inconsequential as to permit its being discarded when empty.

Having thus described the invention and illustrated its use, what is claimed as new and is desired to be secured by Letters Patent is:

1. As a new article of manufacture, a dispensing magazine charged with serially removable weld pins comprising, in combination, a stack of weld pins each including a head portion and a shank portion at right angles to said head portion, an open channel in said head extending from said shank to the periphery of said head, and a non-reentrant recess portion formed in said head, said pins being stacked with the under surfaces of the heads of each pin overlapping the upper surface of the next lower pin and with the shanks of adjacent pins in parallel overlapping relation and extending through the channel portions of said adjacent pins, and with said recess portions in alignment, an elongated carrier member including a guide means extending lengthwisely of said stack for supporting said stack for axial movement relative to said carrier, and retainer means extending into the aligned recess portions of said stack, for limiting transverse movement of said pins relative to said carrier.

2. The charged magazine of claim 1 wherein said retainer means is of lesser length than said guide means, the terminal end of said retainer means defining a discharge station whereat said pins may be transversely shifted clear of said magazine.

3. The magazine of claim 1 wherein said recesses of said pins are in communication with said channels, said guide means comprises at least one flange extending between each said shank and a wall defining said channel, and said retainer means comprises an elongated lip angularly offset from said flange and disposed within said recesses.

4. The magazine of claim 3 wherein said carrier member is generally U-shaped in transverse section and includes a pair of parallel flanges connected by a back portion, said shanks being disposed within said U of said carrier member.

5. The magazine of claim 4 wherein said pins include two said recesses located, respectively, at opposite sides of the junction of said shank and head, and said flanges each include a said lip forming a terminal extension thereof and lying within one of said recesses.

6. A dispensing magazine charged with serially removable weld pins comprising, in combination, a stack of integral sheet metal weld pins, each including a head portion, a shank portion bent at right angles to said head portion, said shank terminating in a sharpened tip, said shank being defined by slits extending from the periphery of the head inwardly to a junction with said head substantially centrally thereof, the space between said slits defining a channel in said head opening to the periphery thereof, at least one enlarged, non-reentrant recess portion forming an extension of and offset from one said slit, said pins of said stack being nested with the under surface of the head of each pin adjacent the upper surface of the next lower pin and with the shanks of adjacent pins in parallel overlapping relation and extending through the channels of a plurality of adjacent pins, and an elongated carrier member supporting said pins against transverse movement while affording axial movement relative to said carrier, said carrier including a track portion disposed within at least one said slit, said track portion including a retainer section having a retainer lip angularly related to said track portion and disposed within said aligned recess portions of said stacked pins to block said transverse movement.

7. The apparatus of claim 6 wherein said carrier member is generally U-shaped in transverse section and includes a pair of parallel flanges defining said track portions connected by a back portion, said flanges extending into said slits, with said shanks being disposed within said U section.

8. The apparatus of claim 7 wherein said pins include two said recess portions in said heads and each said flange includes an angularly offset lip extending into a different one of said recess portions.

9. The apparatus of claim 8 wherein said lips extend less than the entire length of said flanges, the terminal ends of said lips defining a discharge station whereat said pins may be shifted transversely outwardly of said carrier.

10. As a new article of manufacture, a dispensing magazine charged with serially removable weld pins, comprising a stack of weld pins, each having a head portion and a shank portion bent at right angles to the head portion, a laterally open channel in said head portion extending from said shank portion to the periphery of said head portion, said pins being nested with the under surface of the head of each pin engaging the upper surface of the next adjacent pin, and with the shanks of adjacent pins in parallel overlapping relation and extending through the channel portions of said adjacent pins, a carrier member, linear track means on said carrier member extending into said channel and slidingly supporting said stack of weld pins, the pins of said stack having their head and shank portions inclined at acute angles relative to the longitudinal axis of said carrier member, whereby the peripheral portions of said heads of said pins are in shingled relation.

* * * * *